US012353744B2

(12) United States Patent
Avraham et al.

(10) Patent No.: US 12,353,744 B2
(45) Date of Patent: Jul. 8, 2025

(54) COLD STORAGE PARTITION MANAGEMENT IN PROOF OF SPACE BLOCKCHAIN SYSTEMS

(71) Applicant: Western Digital Technologies, Inc., San Jose, CA (US)

(72) Inventors: David Avraham, Even Yehuda (IL); Alexander Bazarsky, Holon (IL); Ran Zamir, Ramat Gan (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/576,634

(22) Filed: Jan. 14, 2022

(65) Prior Publication Data
US 2023/0229331 A1    Jul. 20, 2023

(51) Int. Cl.
G06F 3/06    (2006.01)

(52) U.S. Cl.
CPC ............ *G06F 3/0644* (2013.01); *G06F 3/061* (2013.01); *G06F 3/0616* (2013.01); *G06F 3/0634* (2013.01); *G06F 3/0659* (2013.01); *G06F 3/0683* (2013.01); *G06F 2212/7204* (2013.01)

(58) Field of Classification Search
CPC ...... G06F 3/0644; G06F 3/061; G06F 3/0616; G06F 3/0634; G06F 3/0659; G06F 3/0683; G06F 2212/7204
See application file for complete search history.

(56) References Cited

U.S. PATENT DOCUMENTS

| | | | | |
|---|---|---|---|---|
| 2006/0143418 A1* | 6/2006 | Takahashi | ............. | G06F 3/0649 711/114 |
| 2015/0205525 A1* | 7/2015 | Chiu | ..................... | G06F 3/0643 711/162 |
| 2019/0146923 A1* | 5/2019 | Das | ..................... | G06F 12/0661 711/113 |
| 2019/0377508 A1* | 12/2019 | Bahar | .................... | G06F 3/0632 |
| 2021/0133070 A1* | 5/2021 | Pletka | ................. | G06F 12/0246 |
| 2022/0326877 A1* | 10/2022 | Byom | ................. | G06F 12/0875 |
| 2023/0185476 A1* | 6/2023 | Bert | ....................... | G06F 3/0605 711/154 |

OTHER PUBLICATIONS

Chia Proof of Space Construction Version 1.1, Jul. 2020, Chia. (Year: 2020).*

* cited by examiner

*Primary Examiner* — Kalpit Parikh
(74) *Attorney, Agent, or Firm* — Rutan & Tucker LLP; Hani Z. Sayed; Ravi Mohan

(57) ABSTRACT

Storage devices are configured to be utilized in a variety of blockchain related activities that rely on a proof of space consensus model. These storage devices are required to process a lot of read and write cycles on their memory devices to generate the desired proof of space consensus data. The generation and storing of this generated data requires very different types of memory device usage. Storage devices may be configured with a first partition for high-speed access for generating the data, while a second partition is also configured for long-term storage of the generated data. As memory devices reach their estimated end-of-life, they can be dynamically reassigned to the second partition. Likewise, some storage devices may be equipped with multiple memory arrays of different types of memory devices. One set of memory devices can be used for generation, while cheaper, write-once or few memory devices are provided for storage.

17 Claims, 10 Drawing Sheets

COLD STORAGE PARTITION MANAGEMENT IN PROOF OF SPACE BLOCKCHAIN SYSTEMS

FIELD

The present disclosure relates to storage systems. More particularly, the present disclosure relates to dynamically managing and preparing cold storage partitions in systems utilized for proof of space blockchain applications.

BACKGROUND

Storage devices are ubiquitous within computing systems. Recently, solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

The increased write and read speeds of SSDs have made them an attractive choice for an increasing number of applications. One of these applications is for the generation of data for blockchain operations. Traditional blockchain processes utilize a proof of work method to generate consensus across a network. However, this process is becoming increasingly criticized for the increased demand being placed on computer central processing units (CPUs) and graphical processing units (GPUs) which are required to generate the proof of work data. This increased demand has led to a shortage of these parts as well as increased the overall use of electricity, contributing to electrical waste.

In response, a series of blockchain systems have been implemented that utilize a proof of space consensus method. Instead of generating calculations in CPUs and GPUs, a series of specialized data is stored within a storage device. This data is then recalled by the network to form a consensus model. Thus, storage device space is the commodity utilized instead of CPUs and GPUs. The generation of the data for these proof of space methods requires a lot of processing read and write cycles which creates a higher demand for the faster processing capabilities of SSDs. However, once generated, the resultant data can be stored elsewhere and only needs to be accessed relatively infrequently.

However, the memory devices within SSDs that store the data have a finite number of uses before they are rendered inoperable. The increased demands of generating the proof of consensus data and the low demands of storing the generated data typically leads to users generating their data on SSDs and storing the data for use within the blockchain application within a second storage device.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
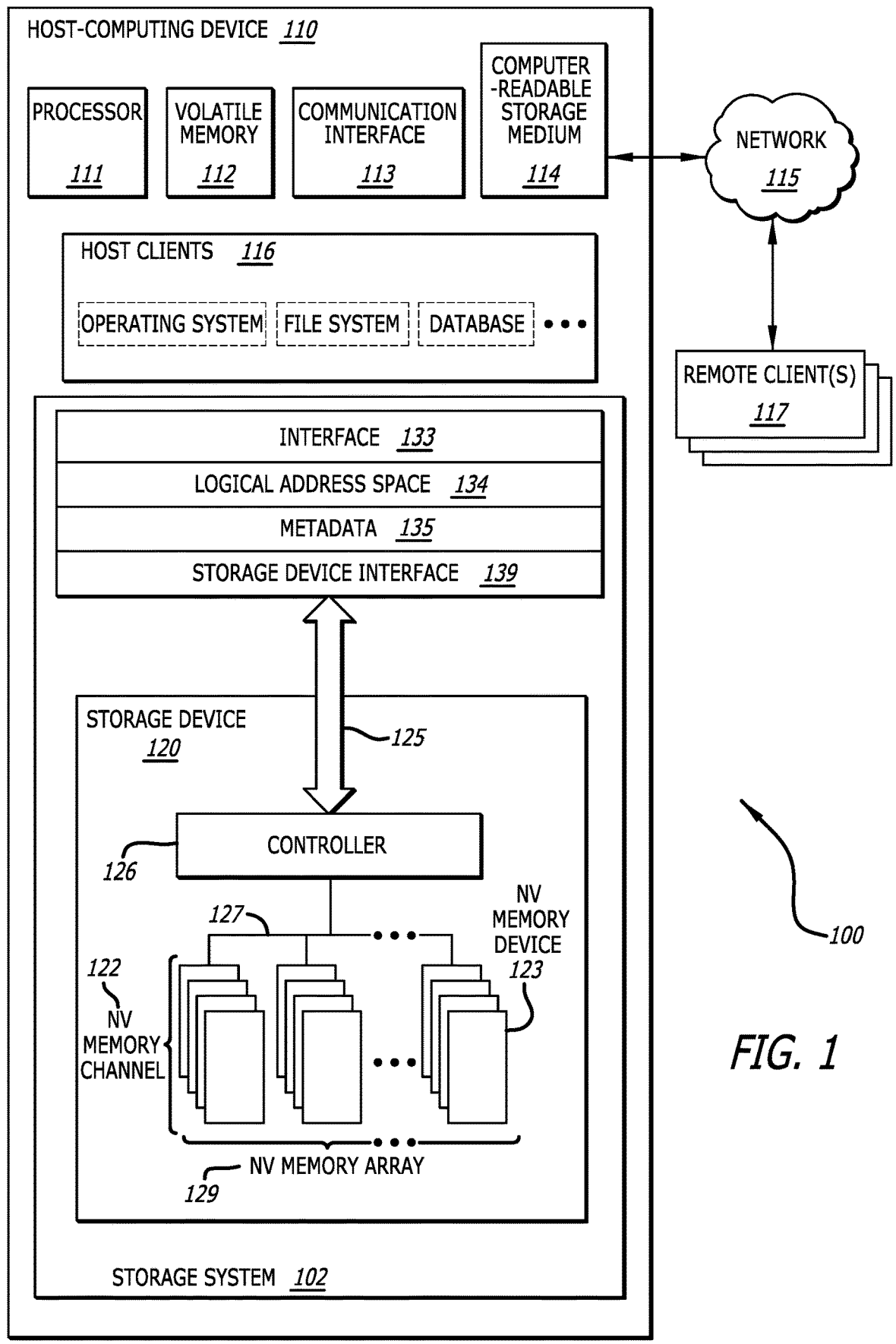
FIG. 1 is a schematic block diagram of a host-computing device with a storage device suitable for cold storage partition management in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that allow single storage devices to be utilized with proof of space blockchain processes. More specifically, many embodiments utilize multiple partitions that are configured for the differing uses of a proof of space blockchain system. In this way, users may be able to facilitate proof of space blockchain mining within a single drive within their system and retain optimal performance. Additional embodiments may allow for unique configurations of storage devices such that increased performance and/or reduced costs may be realized through the use of specialized memory arrays.

In a number of embodiments, users may desire to utilize storage devices for a proof of space mining operation. One such proof of space-based blockchain network is called Chia. Chia cryptocurrency utilizes proof of space consensus methods to generate new blocks within its blockchain. This proof of space data for Chia is called a "plot." Chia plots are typically generated through a "plotting" process which requires a lot of read and write cycles within the memory devices of a storage device. Once generated however, the completed plot only needs occasional access for challenge responses. This completed plot data can be stored in a long-term storage partition which may configured to only be written to once or a few times. This type of storage can be dubbed "cold storage" as it is not likely to be accessed very often compared to the partition that is utilized to generate the plots.

In a variety of embodiments, the storage device may comprise a single memory array which is divided into the two necessary partitions (or more). The first partition can be configured for high-speed or fast access, while the second partition can be configured for long-term storage. However, embodiments of the current disclosure can monitor the health of the memory devices within the memory array and select end-of-life memory devices for allocation from the first partition to the second partition. In this way, the sizes of the various partitions will be dynamically changed, with the first partition being reduced in size while the second partition is increased respectively. This dynamic partition management can be configured to follow the overall finite lifespan of the storage device such that it becomes optimized for proof of space consensus data generation and storage.

In further embodiments, the storage device may be configured with multiple memory arrays. The first memory array may be regular NAND memory devices that allow for typical high-speed access while the second memory array comprises ROM or other similar write few, read many memory devices. Of course, it will be understood that any specific type of memory device may be used, and can be configured for each task. In additional embodiments, the known lifespan of NAND memory devices and the generation of proof of space consensus data can be used to calculate the proper size of ROM memory that should be within the storage device to allow for maximum usage of the NAND memory devices before they reach end-of-life.

Finally, when transferring data into cold storage, care can be taken to verify that the data is written as reliably as it can be. As those skilled in the art will recognize, a low-error method of writing data to memory devices includes writing (or programming) the memory device slowly or at least slower than is typical. This slower writing method can reduce the chances of data errors within the memory device. Thus, embodiments of the storage devices described herein can be configured with a specialized low-error writing process for transferring data to cold storage where it may be written to memory devices that may not be able to be re-written to again.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for cold storage partition management in accordance with an embodiment of the disclosure is shown. The cold storage partition management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
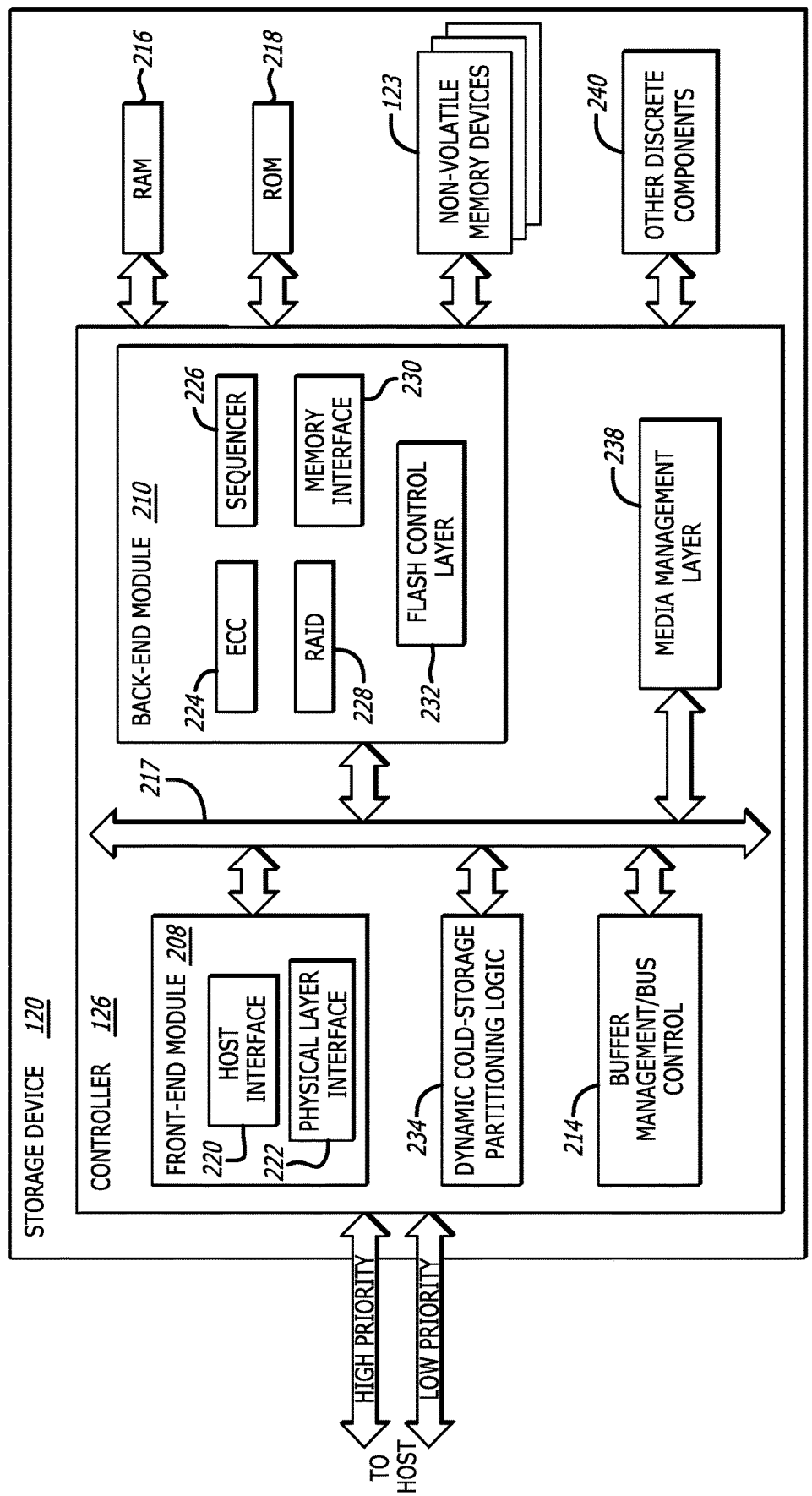
FIG. 2 is a schematic block diagram of a storage device suitable for cold storage partition management in accordance with an embodiment of the disclosure.

Referring to FIG. 2, a schematic block diagram of a storage device 120 suitable for cold storage partition management in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a dynamic cold-storage partitioning logic 234. In many embodiments, the dynamic cold-storage partitioning logic 234 can be configured to monitor data usage, received host commands, and partition conditions within the storage device 120. For example, the dynamic cold-storage partitioning logic 234 can detect when a specific host command is received that indicates that a certain process related to proof of space consensus data generation is completed. This can trigger the moving of one portion of data within the memory array from a first partition to a second partition. This may also trigger an evaluation of the overall status of the memory devices within the various partitions to determine what the current lifespan may be for each memory device. As will be discussed in more detail below, memory devices that fall below a certain threshold of use may be deemed to be end-of-life and may be selected for reallocation from a first high-speed partition to a second, long-term storage partition within the memory array.

Figure 3:
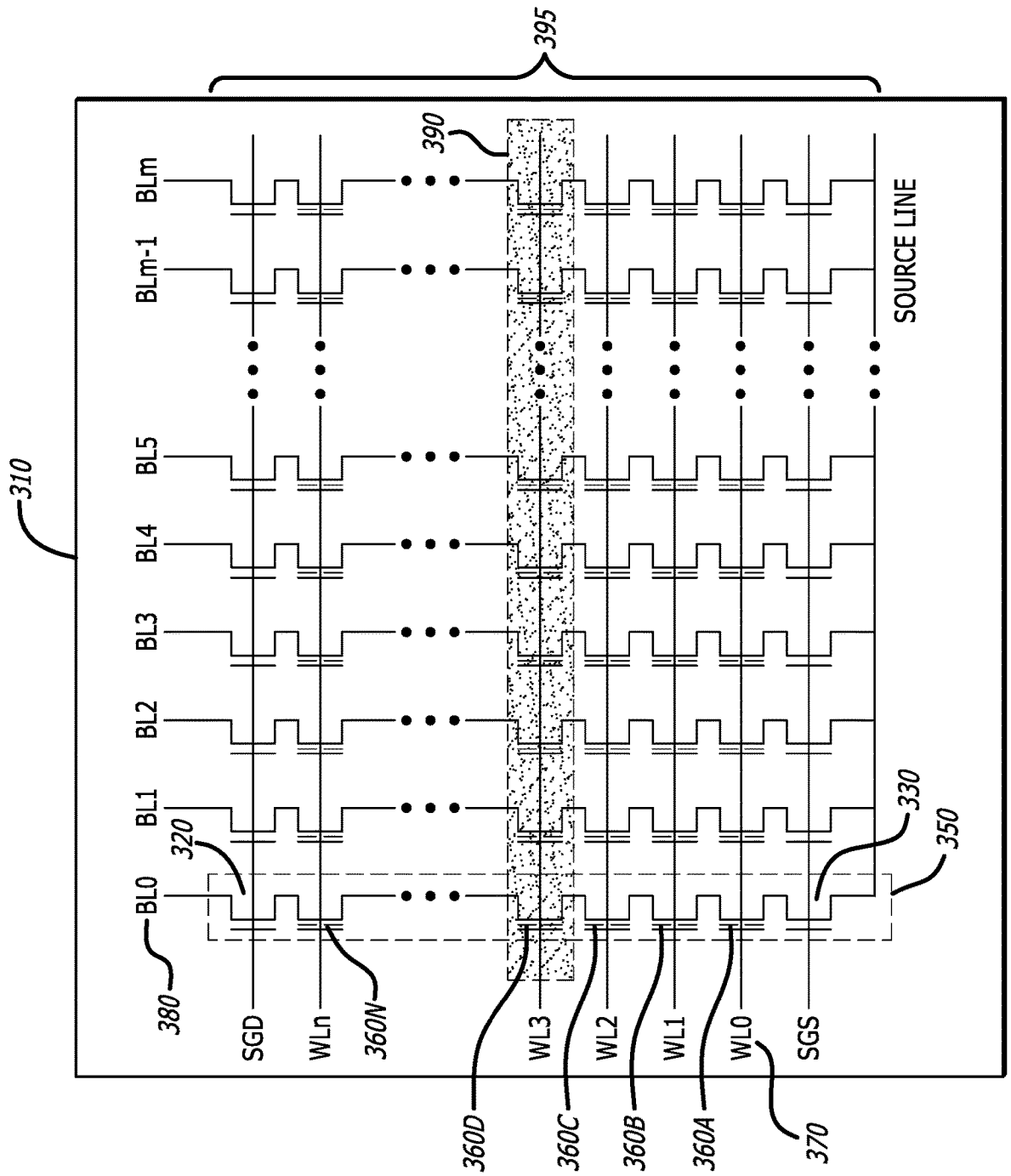
FIG. 3 is a conceptual schematic diagram of a two-dimensional memory array in accordance with an embodiment of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations. The sum of these groups of pages is considered a block 395. The memory block 395 can also be further arranged and configured with other memory blocks to generate larger memory structures as described in more detail below.

These memory blocks also typically have a finite lifespan, meaning that they will eventually fail over time. Specifically, each time the memory cell is written to, and erased, it may be harder to hold a proper charge such that a particular (and correct) piece of data may be retrieved from the cell. Thus, data storage manufacturer's configure various methods on storage devices to make sure wear within the storage device is spread across all blocks and memory devices somewhat equally. Eventually though, there may be a point where it is not possible to reliably store data within the memory cell. Instead of waiting until this happens, storage device manufacturers may elect to set a predetermined threshold of use based on the expected lifespan of the memory device. In this way, after the memory device reaches a certain number of write and erase cycles, it can be deemed "end-of-life" and thus removed from usage within the memory array. However, as discussed in more detail below, these end-of-life memory devices may instead be allocated to a different partition that may use them for long-term data storage.

Figure 4:
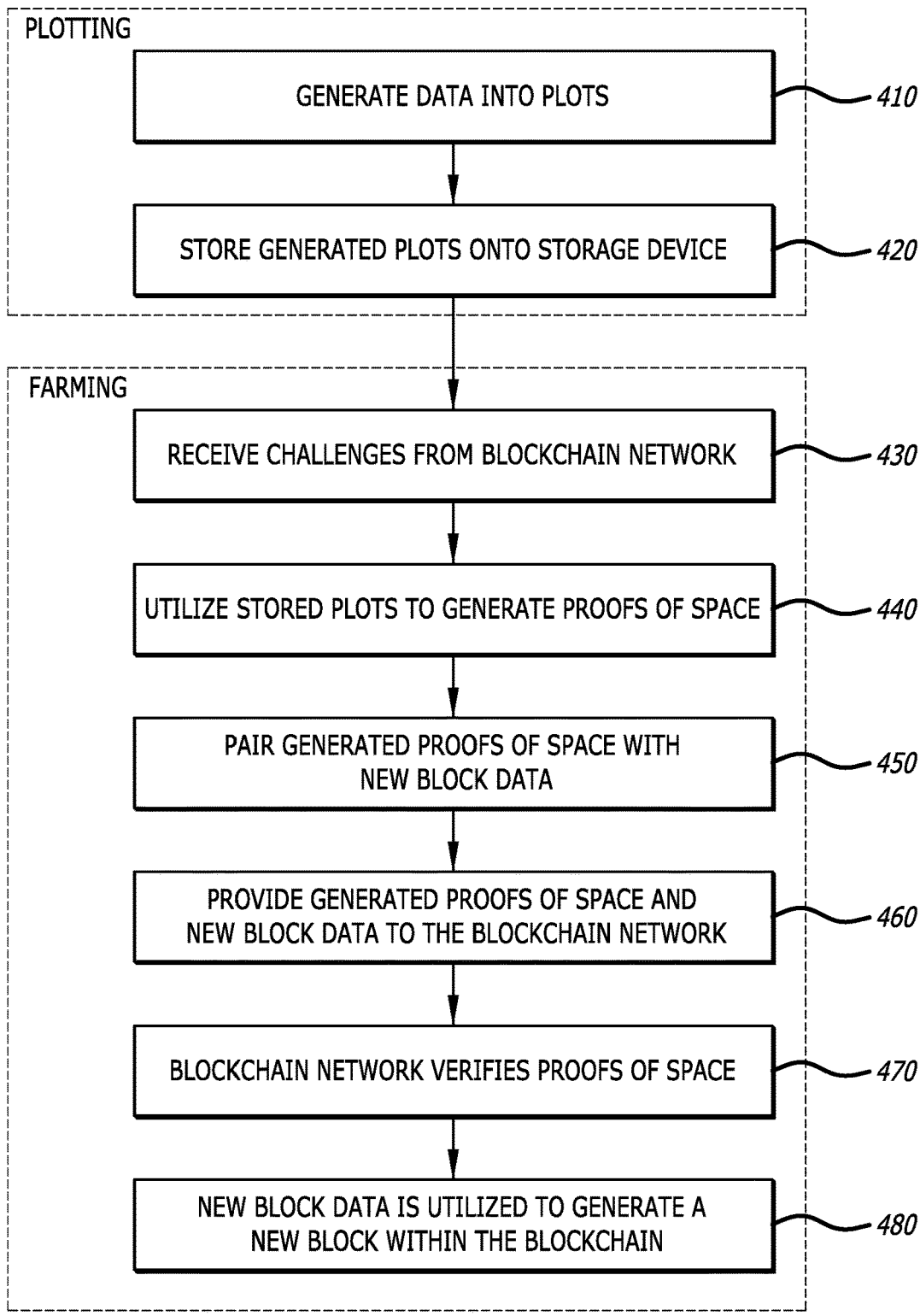
FIG. 4 is a flowchart depicting a process for mining cryptocurrency utilizing a proof of space consensus method in accordance with an embodiment of the disclosure.

Referring to FIG. 4, a flowchart depicting a process 400 for mining cryptocurrency utilizing a proof of space consensus method is shown. As discussed above, the mining of cryptocurrency can come in many forms. In a growing number of applications, cryptocurrency that uses a consensus method of proof of space can be utilized as an alternative to the currently more popular proof of work method. One example of a blockchain-based cryptocurrency that utilizes proof of space as a consensus method is Chia. Chia is centered on creating (i.e., "plotting") large quantities of proof of space consensus data that is formatted into one or more "plots." These plots are then stored on a hard drive for future accessing by the online Chia blockchain network. The plots comprise a series of hashed tables which may be accessed by the Chia network in response to a challenge posed by the network. This process of storing the plots and providing them to the online Chia network for challenge processing is called "farming."

In a typical proof of space blockchain process 400 the plotting stage can begin by generating data into plots (block 410). Although Chia utilizes plots, some embodiments may be able to be formatted for use within other proof of space-based blockchain-based systems. In many embodiments, the generation of plot data involves the creation of a plurality of tables comprising cryptographic hashes that may be nested, self-referential, or otherwise related. In various embodiments, the hashes created through a back propagation method and are then sorted and compressed throughout the tables. The plots are completed and stored onto a storage device (block 420). This generation of plots creates a lot of input and output processes within the storage device and benefits from high-speed storage devices. This results in many users utilizing SSDs for plotting operations. However, the nature of many SSDs and their finite endurance leads to many users copying the generated plots to a secondary storage device that is more configured for long-term storage.

The farming stage of proof of space consensus blockchain system comprises all of the remaining steps. Farming can begin by receiving one or more challenges from the blockchain network (block 430). The exact type of challenge may vary based on the cryptocurrency process used. For example, the challenge may be a problem that must be solved within a certain time and/or in a particular format. The process 400 can utilize the stored plots to generate proofs of space (block 440). These proofs of space are required of the challenge answers that allow the user to attempt to add their contribution to the blockchain and reap a reward. In a variety of embodiments, the generated proofs of space are paired with new block data (block 450). New block data can include a proposed data block to add to the blockchain. Those skilled in the art will understand that this new block data may be comprised of sub-blocks or any other proposed block data as required by the blockchain being utilized.

The paired proofs of space and new block data is transmitted onto the blockchain network (block 460). The transmitted data is not automatically added to the blockchain but needs to satisfy one or more requirements as more than one user on the network may have submitted a valid proof to the challenge. During the selection of a potential new block, the blockchain network will verify the submitted proofs of space (block 470). This can be done in a variety of ways depending on the exact blockchain used. Once the blockchain network has settled on a particular block candidate that was submitted, the new block data is utilized to generate new block within the blockchain (block 480).

Figure 5:
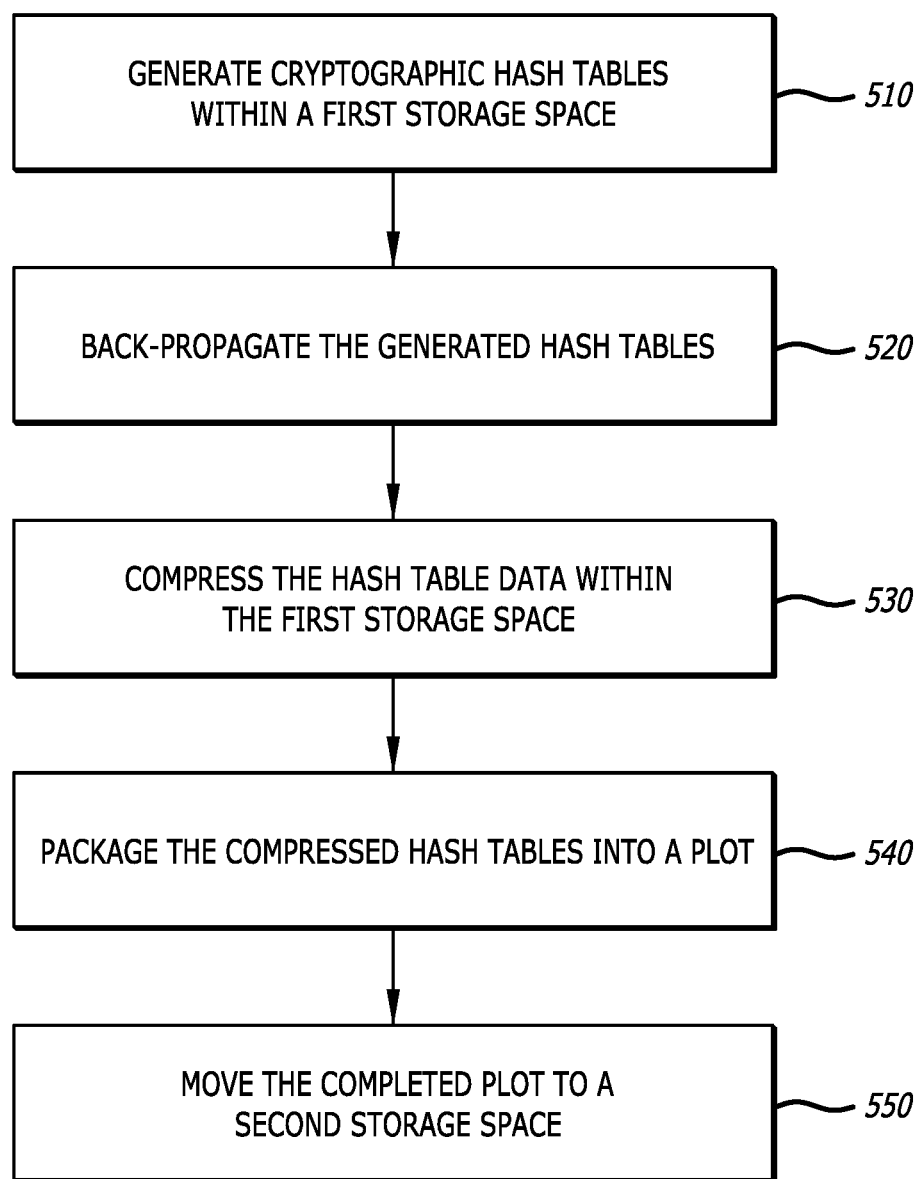
FIG. 5 is a flowchart depicting a process for processing and storing a plot of data associated with a proof of space consensus method in accordance with an embodiment of the disclosure.

Referring to FIG. 5, a flowchart depicting a process 500 for processing and storing a plot of data associated with a proof of space consensus method is shown. In many embodiments, the plotting may be done by a Chia-based client application. The Chia-client may begin the process 500 by generating a plurality of cryptographic hash tables within a first storage space (block 510). The user of the Chia-client may have configured the first storage space as a high-speed storage space or at least a high-speed partition within the storage device.

In a variety of embodiments, once the cryptographic hash tables have been generated, they may be back-propagated through the tables (block 520). This process may involve a number of calculations and require a significant amount of time and/or input and output resources to process. In further embodiments, this hash table data can be compressed within the first, high-speed storage space (block 530). These compressed hash tables can be formatted into a compressed single package, which may be dubbed a "plot" (block 540). For example, in Chia, the size of a plot may exceed one-hundred gigabytes in size. Upon completion of the plot packaging, the process 500 can facilitate transfer of the completed plot to a second storage space which is typically configured to longer-term storage (block 550).

Figure 6:
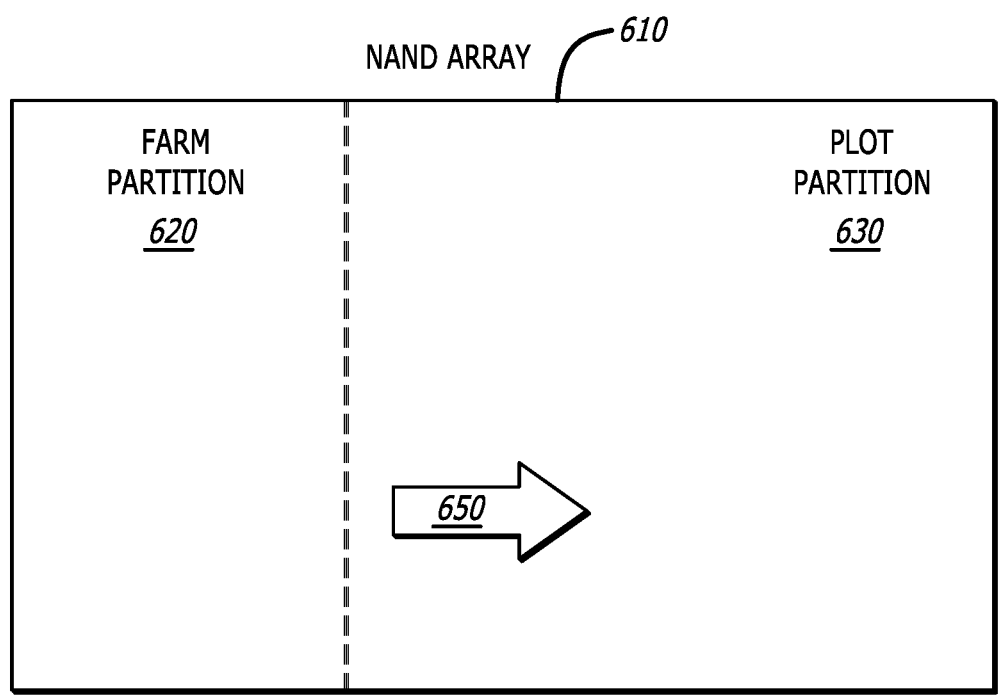
FIG. 6 is a conceptual illustration of a memory array with a dynamically managed first and second partition configured for processing proof of space consensus data in accordance with an embodiment of the disclosure.

Referring to FIG. 6, a conceptual illustration of a memory array with a dynamically managed first and second partition configured for processing proof of space consensus data is shown. In a number of embodiments, a storage device will comprise a NAND array 610 composed of a plurality of memory devices. As those skilled in the art will understand, the NAND array 610 can be formatted into a number of partitions. In many embodiments, the NAND array 610 can be partitioned into a first partition and a second partition for use with dynamically managed proof of space consensus data. The embodiment depicted in FIG. 6 is configured for use with the Chia blockchain network and has a first, plot partition 630 and a second, farm partition 620. Conceptually, the partitions 620, 630 within the NAND array 610 are separated by a dashed line to indicate the relative number of memory devices allocated to each partition.

Embodiments of the current disclosure can dynamically increase the size of the farm partition 620 over time while decreasing the size of the plot partition 630 which is conceptually indicated by the arrow 650. The generation of plots within the plot partition 630 requires a lot of operations on those memory devices. The overall lifespan of those memory devices used for plot generation within the plot partition 630 will start to decrease over time. Likewise, the generation of plots requires more and more space for storage, which creates a need for an increased farm partition 620 for long-term storage of the generated plots. In a variety of embodiments, the NAND array 610 can be dynamically managed to select and reallocate memory devices from the plot partition 630 to the farm partition 620.

Although the dashed line indicates the conceptual divide between the two partitions 620, 630 within the NAND array 610, this should not be understood to be a direct physical demarcation. In other words, the dashed line indicates a conceptual ratio between the two partitions 620, 630 within the NAND array 610. Thus, it is not necessary that to increase the size of the farm partition 620, the memory devices closest to the dashed line should be selected. In fact, memory devices from any area of the plot partition 630 may be selected. As a result, the storage device may analyze and select various memory devices throughout the plot partition 630 that indicate that they are past a pre-determined threshold, which may include memory devices past a certain number of use cycles or other lifespan indicator. As these memory devices are detected, they may be pooled together and added to the farm partition 620 for limited use in storing the generated and completed plots for future reading. In some embodiments, the process of transferring this data is done utilizing a specialized or unique writing method, shown in more detail below in the discussion of FIG. 8.

Additionally, the embodiments and related descriptions above with respect to FIG. 6 were focused on the Chia cryptocurrency method. However, it will be understood by those skilled in the art that this process may apply to any proof of space-based consensus method. References to the farm partition 620 and/or plot partition 630 may be replaced by a first or second partition based on how the proof of space consensus data is processed.

Figure 7:
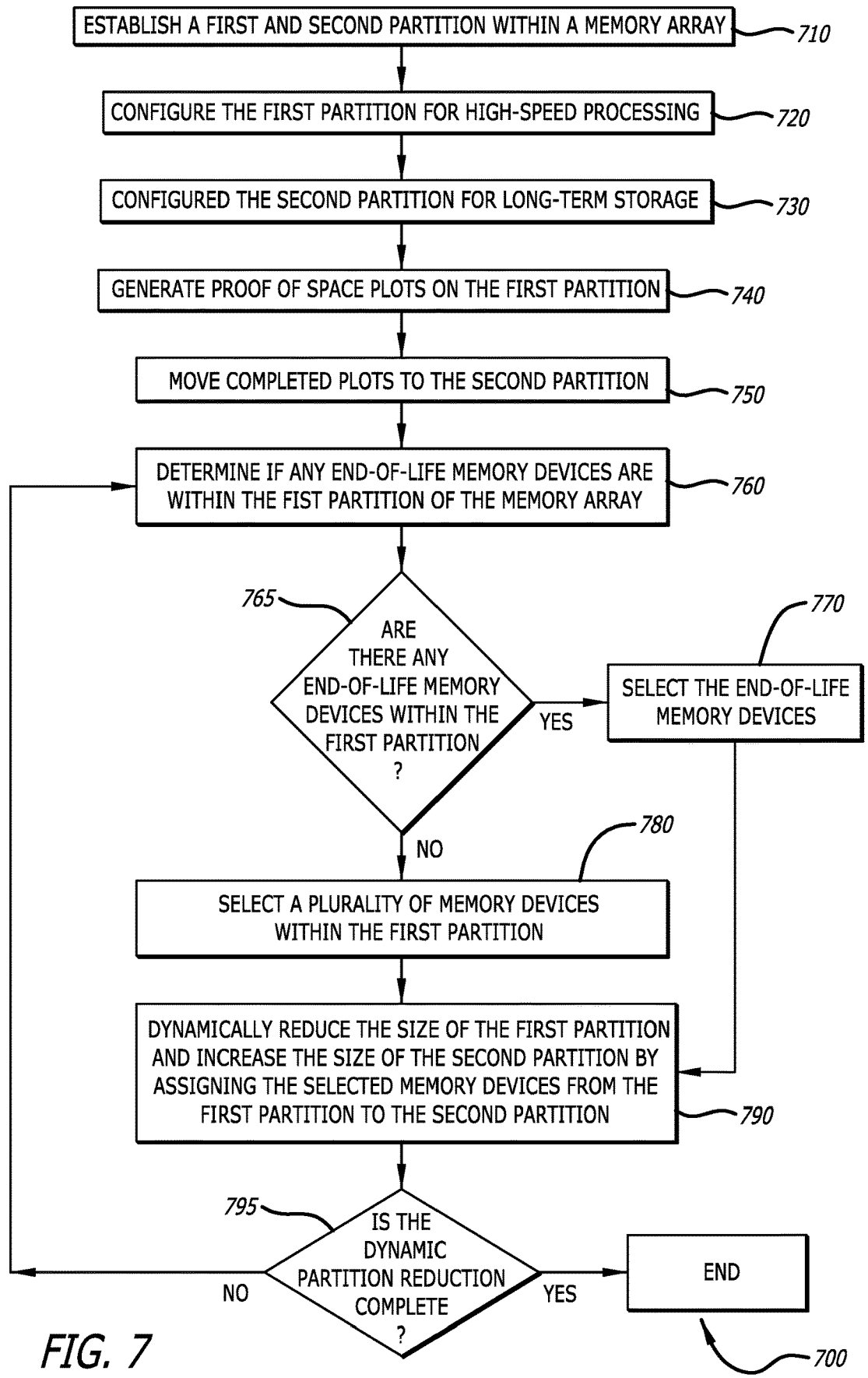
FIG. 7 is a flowchart depicting a process for dynamically managing partitions for processing proof of space consensus data in accordance with an embodiment of the disclosure.

Referring to FIG. 7, a flowchart depicting a process 700 for dynamically managing partitions for processing proof of space consensus data is shown. In many embodiments, the process can establish a first and second partition within a memory array (block 710). The first and second array is configured for use in proof of space consensus data processing. However, in some embodiments, the first and second partition may share the storage device with other non-blockchain focused partitions such as a partition for the host operating system or other applications. The process 700 can configured the first partition for high-speed processing (block 720). This step may include allocating memory devices that have not been utilized yet, have the highest overall estimated lifespan, or have better access to other resources within the storage device and/or host.

Similarly, the process 700 can configure the second partition for long-term storage (block 730). This step may include determining and selecting various memory blocks that exceed a certain usage threshold, have a lower overall estimated lifespan, or other selection criteria such as, but not limited to, determining the number of resources available to the memory devices. For example, memory devices may exist in a configuration wherein certain memory devices are physically located closer to communication channels and/or host components which may allow for increased or decreased performance relative to other memory devices. This may be known at manufacturing and could be programmed into the storage device firmware for use in selecting memory devices within the first and second partitions.

Once configured, the process 700 can begin to generate proof of space lots within the first partition configured for higher processing speeds (block 740). As indicated above, many embodiments may generate plots of data for use within a Chia blockchain network. Upon completion, the process 700 may then move the plot data to the second partition for long-term storage (block 750). Once moved, the storage device can begin to analyze the memory devices within the array(s).

In a variety of embodiments, the process 700 can determine if any end-of-life memory devices are within the first partition of the memory array (block 760). During the proof of space consensus data generating process, a plurality of memory devices may have been utilized overwhelmingly to the point that the overall estimated lifespan of the memory device is below a predetermined threshold to avoid data loss. For example, each memory device may be rated for a certain number of write and erase cycles, and the predetermined threshold is set at eighty percent of that estimate, meaning that memory devices that had a write and erase operation performed on them over eighty percent of the entire estimated average of the lifespan may be considered an end-of-life memory device.

During the normal use of the storage device, the determination may be made that the size of the second partition should be increased, and the first partition should be decreased to account. This can be done in response to a new plot being generated and having an insufficient amount of space remaining in the second partition. However, the dynamic adjustment of partitions may also be in response to the lack of space within the second partition that falls beneath a pre-determined threshold, like for example, not having enough memory devices to store another plot in the future.

The process 700 can then act if any end-of-life memory devices are currently within the first partition (block 765). If there are a plurality of end-of-life memory devices within the first partition, the process 700 can select those memory devices (block 770). With those selected memory devices, the first partition can be dynamically reduced by assigning them to the second partition (block 790). The process 700 may then evaluate if the necessary dynamic partition reduction is complete (block 795).

In various embodiments, the dynamic partitioning may be done in passes, or in cycles when working with multiple partitions. Also, there may not be enough end-of-life memory devices to satisfy the necessary dynamic increase of the second partition. Thus, when the reduction process is not completed, it may be necessary to determine once again if there are any remaining end-of-life memory devices within the first partition of the memory array. In certain embodiments, especially in those embodiments where the storage device is configured with more than two partitions, the process 700 may search the non-blockchain focused partitions for end-of-life memory devices and assign them to the second partition and replacing out the memory devices lost in the swap from memory devices in the first partition, thus decreasing the first partition and increasing the size of the second partition.

If further end-of-life memory devices are not present, the process 700 can simply select a plurality of memory devices with the first partition (block 780). This selection may still be done based on a number of usage factors or other endurance-related metrics, even if the memory device doesn't satisfy the predetermined threshold for end-of-life. The non-end-of-life memory devices may then be utilized to dynamically reduce the size of the first partition and increase the size of the second partition by assigning them to the second partition (block 790). If the dynamic partition reduction process is complete, then the process 700 may end.

Figure 8:
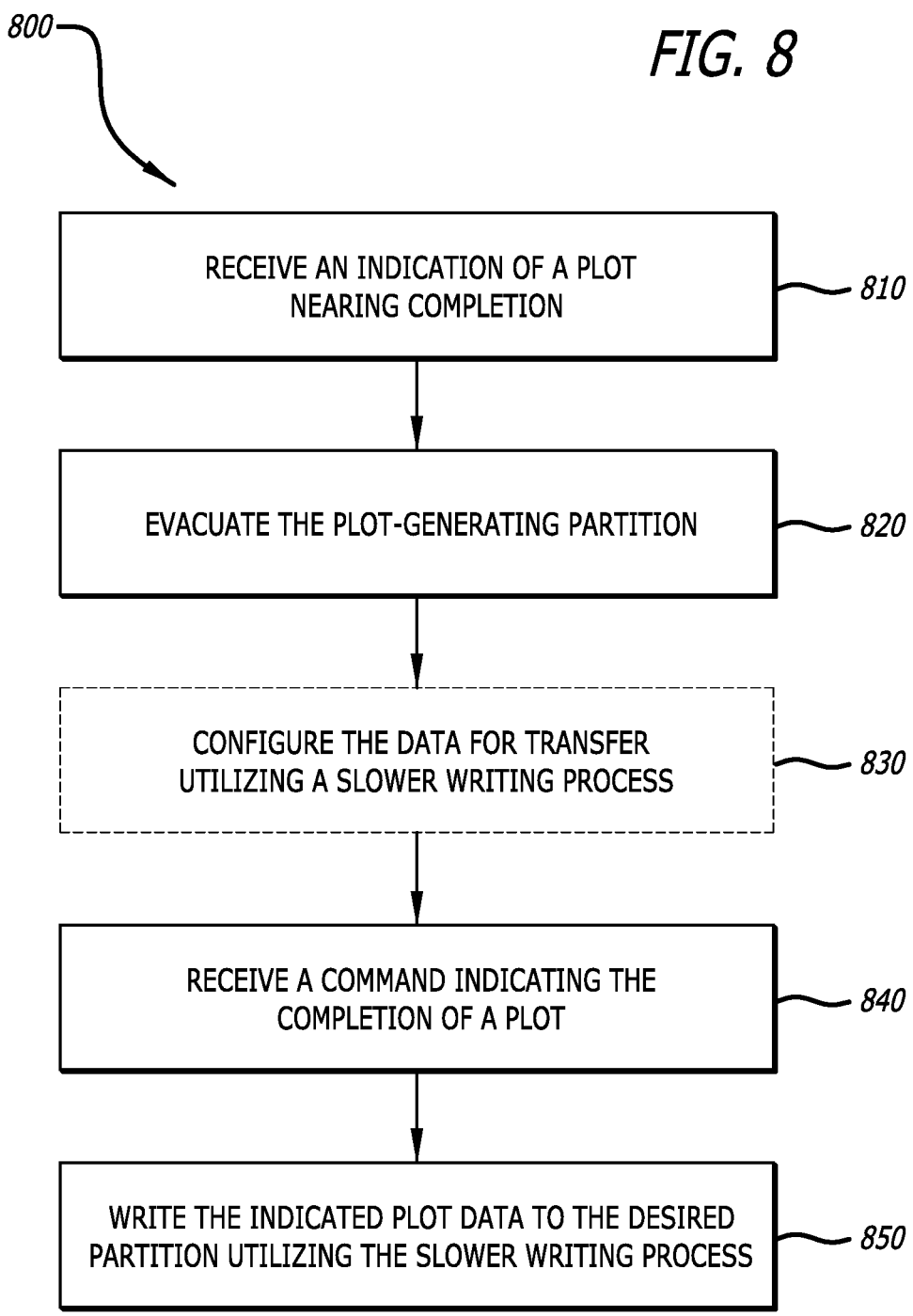
FIG. 8 is a flowchart depicting a process for utilizing specialized writing processes for transferring proof of space consensus data from a first partition to a second, cold-storage partition; in accordance with an embodiment of the disclosure

Referring to FIG. 8, a flowchart depicting a process 800 for utilizing specialized writing processes for transferring proof of space consensus data from a first partition to a second, cold-storage partition is shown. As discussed above, long-term storage partitions, or "cold-storage" can be configured to store data that will likely not be modified in the future. The data may be accessed many times, but not very often. When generating proof of space data for blockchain applications, it may be beneficial to store the data within a cold-storage partition. However, as those skilled in the art will understand, the data writing process is not infallible and may generate errors when attempting to store the data. Thus, in many embodiments it is desired to write the data to the cold-storage partitions using a low-error writing method.

The embodiment depicted in FIG. 8 discusses Chia-based "plot" data but this process 800 may be applied to any proof of space consensus data system. In a number of embodiments, an indication of a plot nearing completion is received (block 810). This indication may come in any variety of ways. For example, the indication may be received as a command from the host. In certain embodiments, the host may issue a vendor-specific command. The process 800 can then evacuate the plot-generating partition (block 820). Often, this step may include cleaning up or otherwise preparing the proof of consensus data for transfer upon completion. In some optional embodiments, the proof of consensus data may be processed or otherwise configured for transfer utilizing a slower writing process (block 830). Depending on the writing process that will be utilized for the transfer, the data to be transferred may need to be organized or otherwise sorted prior to transfer.

At some point, the process 800 will receive a command indicating the completion of a plot (block 840). Again, this command may be a host command sent to a storage device and may comprise a vendor specific (i.e., non-spec) command. Once received, the process 800 can write the indicated plot data to the desired partition (typically a second, cold-storage partition) utilizing a slower writing process (block 850). As those skilled in the art will recognize, a slower-writing process is typically results in fewer errors after writing. In a number of embodiments, the process 800 may simply utilize the lowest-error writing method available. The utilized writing method may also include additional writing steps that are not typically utilized in regular memory device writing, such as additional error-checking steps.

Figure 9:
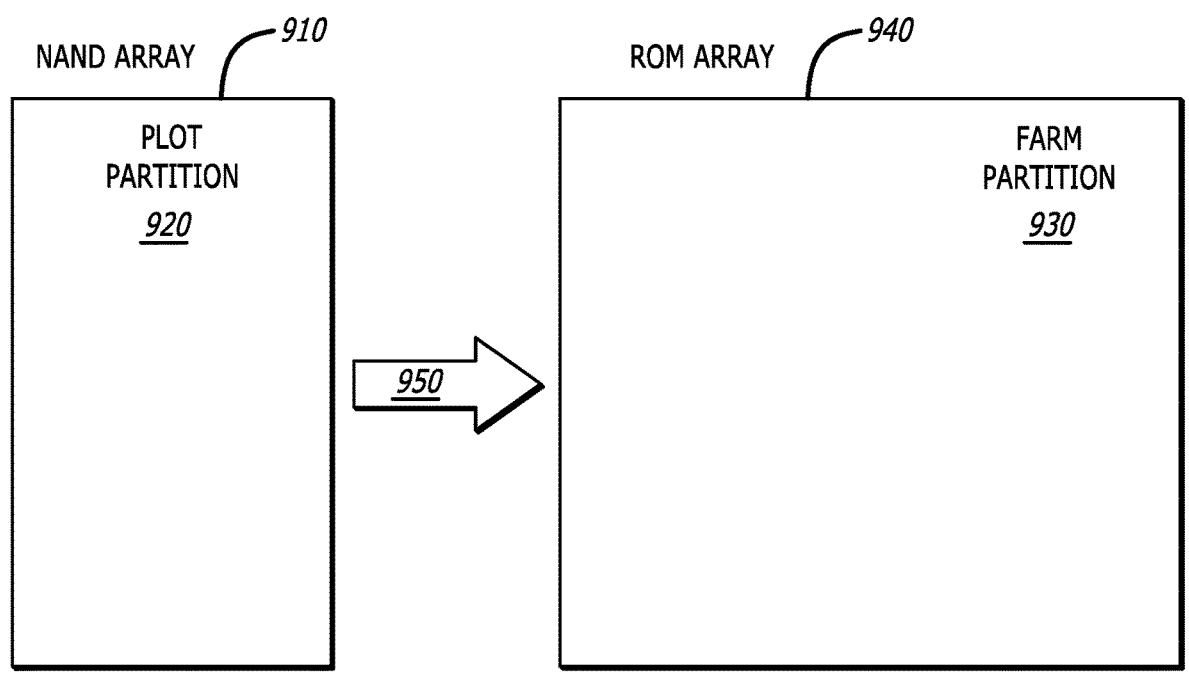
FIG. 9 is a conceptual illustration of a dual memory array configuration with a dynamically managed first and second partition configured for processing proof of space consensus data in accordance with an embodiment of the disclosure.

Referring to FIG. 9, a conceptual illustration of a dual memory array configuration with a dynamically managed first and second partition configured for processing proof of space consensus data is shown. In many storage devices, there is a single overall memory array which consists of the same type of memory devices. However, storage devices may be configured with multiple memory arrays of different types of memory devices. In this way, configurations of partitions can be best matched up with a memory device type based on the expected usage. For proof of space consensus blockchain applications, it may be desirable to have a first memory device type that can provide for high-speed processing, and a second memory device type that is geared for long-term storage. For example, a first partition may be configured with high-speed NAND memory devices for the generation of proof of consensus data and a second read-only-memory ROM type memory device array which can be configured for long-term storage.

Once again, the embodiment depicted in FIG. 9 is configured for Chia plot generation and storage. Thus, the NAND array 910 is configured as a plot partition 920 and the ROM array 940 is configured as a farm partition 930. However, it will be understood by those skilled in the art that other memory device types may be used, such as, but not limited to, EEPROM and the like. The size of the partitions in FIG. 9 is meant to convey the relative number and/or ratio of memory devices between the farm partition and the smaller plotting partition.

In many embodiments, the plot partition 920 is utilized for the generation of plot data which can be subsequently transferred to the farm partition 930 within the ROM array 940 for farming. Because the memory devices of SSDs have a finite and typically specified life span, it may be possible to estimate how many plots can be generated. For example, if it is known that about 1.5 terabytes of data is written to the plot partition 920 to create one plot, and the average lifespan of the memory devices (typically denoted as terabytes written (TWB)) is forty, then we can divide the overall lifespan by the plot data needed to discover that about twenty-six plots may be generated within that section of the plot partition 920. Based on this knowledge, we may be able to configure the storage device in such a way that the overall estimate plot data size is roughly equal to the overall size of the farming partition. So, if we know about twenty-six plots of roughly one-hundred gigabytes in size may be generated within the plot partition 920, we may be able to configure the ROM array 940 with 2.6 terabytes to make sure all of those plots will be stored.

Thus, as the size of the plot partition 920 increases in size, the relative size of the farm partition 930 also increases. In various embodiments, it may be cheaper to provide a much larger ROM array 940 as the read only memory device or write-few memory devices may be cheaper to produce and/or provide within a storage device. The NAND array 910 may also be configured with even higher-speed memory devices for increased proof of space consensus data generation speeds, making up for the increased costs of the NAND array 910 by the decreased costs of the ROM array 940. Additionally, the transfer process 950 between the two partitions (denoted with an arrow) may be specially configured for these applications. For example, a slower or even more low-error writing process may be utilized that may not be practical or affordable in traditional storage devices. These transfers may continue until the NAND array 910 has no or relatively few memory devices that are not classified as end-of-life and the ROM array 940 is nearly completely full. In this way, the storage device has turned into a full "cold storage" device that may be useful for providing proof of work consensus data, but otherwise be less than ideal for typical non-blockchain use.

Figure 10:
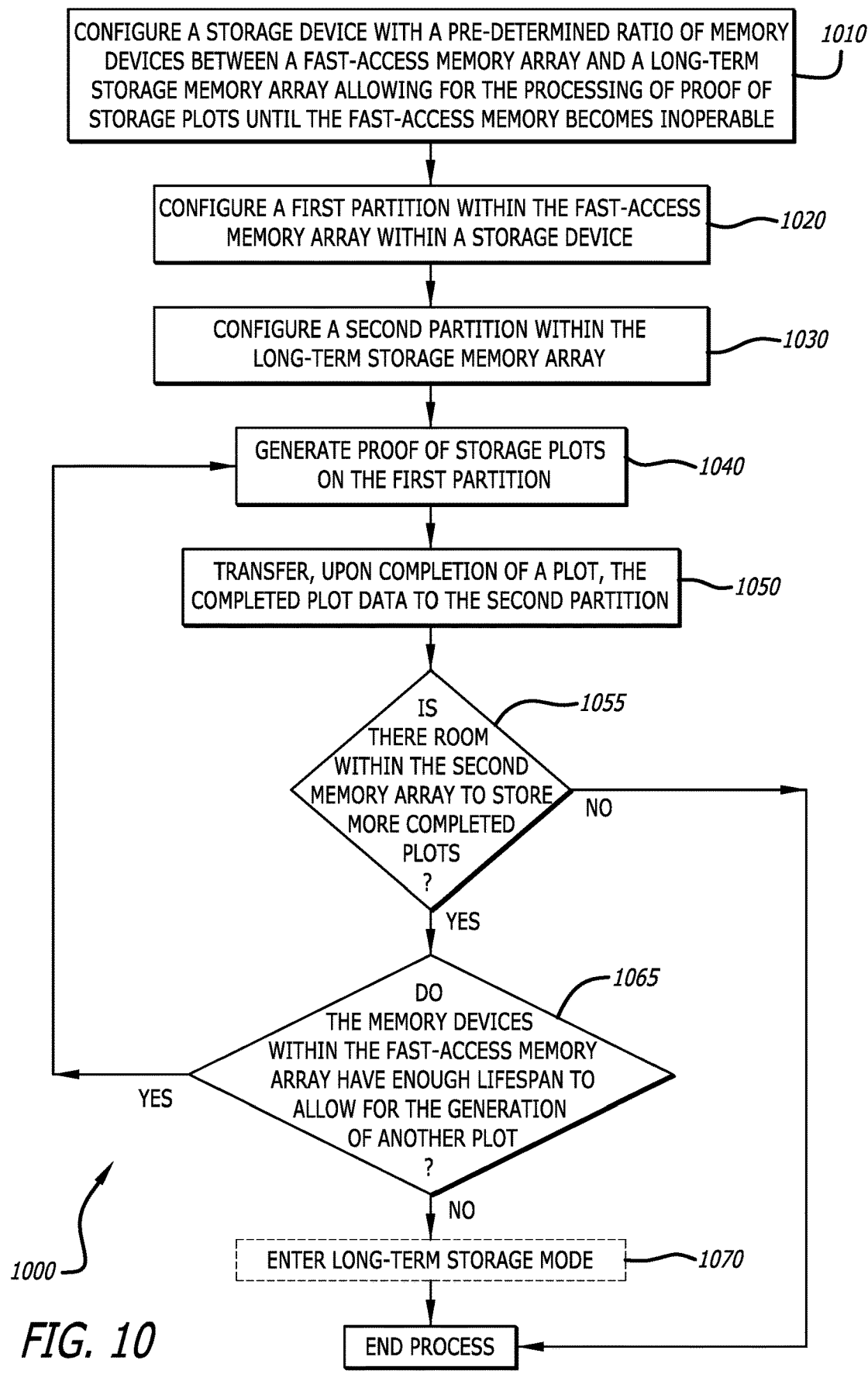
FIG. 10 is a flowchart depicting a process for dynamically managing a storage device with a dual memory array configuration for processing proof of space consensus data in accordance with an embodiment of the disclosure.

Referring to FIG. 10, a flowchart depicting a process 1000 for dynamically managing a storage device with a dual memory array configuration for processing proof of space consensus data is shown. Similar to the device depicted in FIG. 9, the process 1000 may begin by configuring a storage device with a pre-determined ratio of memory devices between a fast-access memory array and long-term storage memory array allowing for the processing of proof of storage plots until the fast-access memory becomes inoperable (block 1010). As discussed above, the fast-access memory devices may not be specifically inoperable but may exceed an end-of-life threshold of data integrity.

The process 1000 may then configured a first partition within the fast-access memory array (block 1020). Likewise, the long-term memory array may be configured with a second partition (block 1030). The storage device may then be utilized as desired to generate proof of storage plots on the first partition (block 1040). As described earlier, the process described in FIG. 10 is directed at Chia plot processing but may be applied to any proof of space data generation process. Once the generation of a plot is completed, it may be transferred to the second partition (block 1050).

Next, the process 1000 may evaluate the current state of the various memory arrays and/or memory devices. For example, in some embodiments, it may be determined if there is any remaining room within the second memory array to store more completed plots (block 1055). For example, it may be the case that the memory devices installed within a given storage device may exceed their projected lifespan. This may result in a situation when further proof of census data may be generated within the storage device, but upon completion, there would be no remaining space within the second partition to store it. In these instances, the process may end. However, in certain embodiments, the storage device may be able to process a single last portion of proof of census data and then retain that generated data within the first partition as a pseudo-cold storage partition.

However, if there is more room within the second (farming) partition and/or memory array to store more completed plots or other proof of consensus data, then the process 1000 may determine if the memory devices within the first fast-access memory array have enough lifespan to allow for the generation of another plot (block 1065). When there is a sufficient number of memory devices within the first partition with a viable lifespan, the process 1000 can again generate more plots or other proof of space consensus data (block 1040). This process 1000 may continue to generate plots until there are no more memory devices within the first fast-access memory array with enough viable lifespan remaining. In some embodiments, this will end the process 1000. However, in a number of embodiments, the storage device may optionally transition into a long-term (i.e., cold) storage mode (block 1070). This long-term storage mode may change the power consumption profile (typically to reduce the overall power consumption of the storage device) or alter the commands that are received and sent to the host.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
    a processor;
    a first memory array comprising:
        a plurality of memory devices including a NAND memory device;
            wherein the plurality of memory devices are configured with a pre-determined ratio of a fast-access memory array and a long-term storage memory array;
            wherein the long-term storage memory array comprises one or more ROM memory devices configured for programming;
    a dynamic cold-storage partitioning logic configured to:
        configure a first partition within the fast-access memory array for high-speed data access;
        configure a second partition within the long-term storage memory array for long-term storage;
        receive a request that a portion of data stored within the first partition is ready for storage within the second partition;

transfer the portion of data to the second partition; and
in response to a completed transfer of the portion of data, select and reconfigure at least a portion of the memory devices within the first partition for use within the second partition wherein the selection of the memory devices is based on a remaining lifespan of the memory devices; and
configuring the device with a pre-determined ratio of memory devices between a fast-access memory array and long-term storage memory array, wherein proof of storage plots are processed until the fast-access memory array becomes inoperable.

2. The device of claim 1, wherein, the transfer of the portion of data utilizes a low-error writing method.

3. The device of claim 2, wherein the low-error writing method is a slower writing method.

4. The device of claim 1, wherein the transferring of the portion of data is done in response to a received command from a host indicating the completion of processing the portion of data.

5. The device of claim 4, wherein the received command is a vendor-specific command.

6. The device of claim 5, wherein the portion of data comprises proof of space consensus data.

7. The device of claim 6, wherein the proof of space consensus data is a plot of data associated with Chia cryptocurrency.

8. The device of claim 7, wherein a size of the second partition grows in relation to a number of plots being stored.

9. The device of claim 7, wherein at least a portion of the memory devices utilized to create plots within the first partition are selected for reconfiguration into the second partition.

10. The device of claim 7, wherein a size of the second partition is dynamically increased in size in order to store generated plots, and wherein a number of memory devices selected for reconfiguration within the second partition is determined to allow for the storage of newly generated plot within the second partition.

11. A device comprising:
a processor;
a first memory array comprising:
a plurality of memory devices configured for high-speed access;
a NAND memory device;
a second memory array comprising:
a plurality of memory devices configured for long-term storage including one or more ROM memory devices configured to be programmed once;
wherein the first memory array and the second memory array are configured with a pre-determined ratio; and
a dynamic cold-storage partitioning logic configured to:
receive a request that a portion of data stored within the first memory array is ready for storage within the second memory array;
transferring the portion of data to the second memory array; and
wherein, the portion of data is a proof of space consensus data configured for long-term storage.

12. The device of claim 11, wherein the first memory array is configured as a first partition and the second memory array is configured as a second partition.

13. The device of claim 11, wherein the proof of space consensus data is plot data associated with Chia cryptocurrency.

14. The device of claim 13, wherein the plot data is generated within the first memory array and subsequently stored within the second memory array.

15. The device of claim 14, wherein a size of the second memory array is configured to match a projected number of plots that can be generated within the first memory array.

16. The device of claim 15, wherein the number of plots projected to be generated within the first memory array is based on an average lifespan of the memory devices utilized within the first memory device.

17. A method of managing partitions for storing proof of space consensus data, comprising:
configuring a device with a pre-determined ratio of memory devices between a fast-access memory array and long-term storage memory array;
wherein the fast-access memory array comprises a NAND memory device, and the long-term storage memory array comprises ROM memory devices configured to be programmed once;
configuring a first partition within the device for high-speed data access;
configuring a second partition within the device for long-term storage;
processing proof of space consensus data within the first partition;
receiving a host request that a selected portion of data stored within the first partition is ready for storage within the second partition;
transferring the selected portion of data to the second partition utilizing a low-error writing process; and
in response to completion of the transfer of the selected portion of data, select and reconfigure at least a portion of memory devices within the first partition for use within the second partition wherein the selection of the memory devices is based on a remaining lifespan of the memory devices.

* * * * *

UNITED STATES PATENT AND TRADEMARK OFFICE
CERTIFICATE OF CORRECTION

| | | |
|---|---|---|
| PATENT NO. | : 12,353,744 B2 | Page 1 of 1 |
| APPLICATION NO. | : 17/576634 | |
| DATED | : July 8, 2025 | |
| INVENTOR(S) | : David Avraham et al. | |

It is certified that error appears in the above-identified patent and that said Letters Patent is hereby corrected as shown below:

On the Title Page

APPLICANT: Should read "Sandisk Technologies, Inc."

Signed and Sealed this
Twenty-sixth Day of August, 2025

Coke Morgan Stewart
*Acting Director of the United States Patent and Trademark Office*